Figure 4:
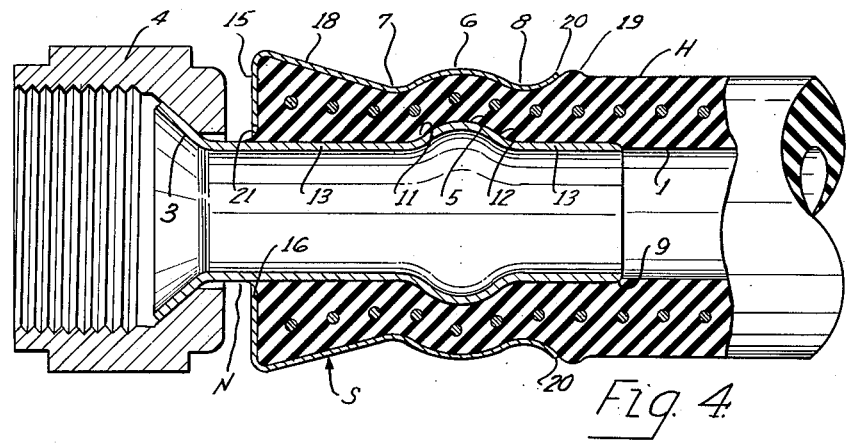

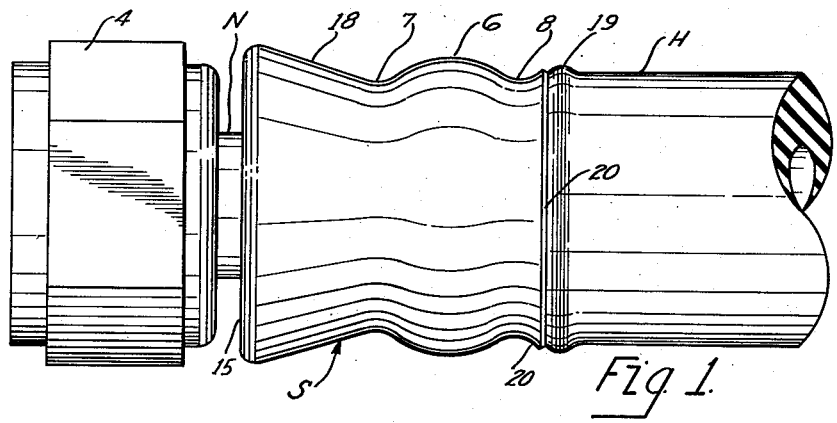
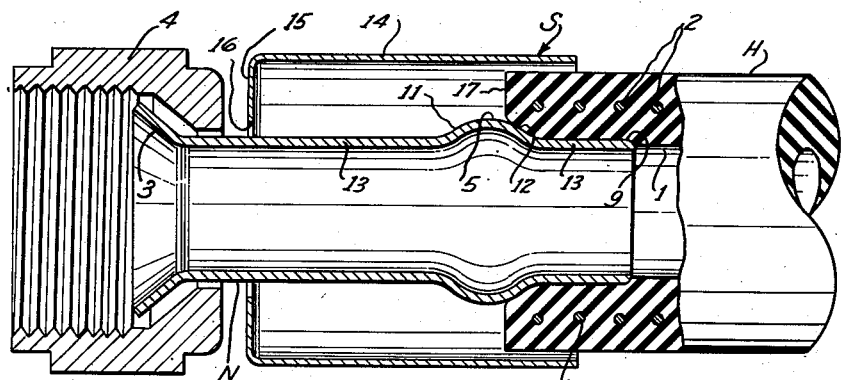
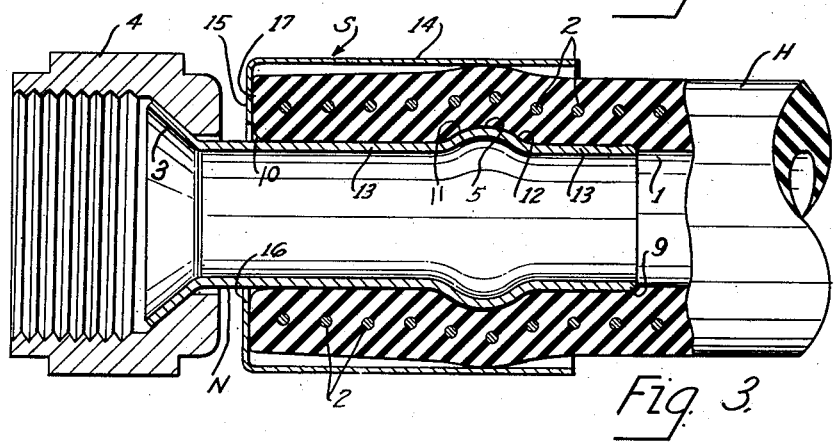

Aug. 10, 1954  J. N. PAQUIN  2,686,066
HOSE COUPLING WITH LOCKING RIBS
Filed Aug. 3, 1951  2 Sheets-Sheet 2

INVENTOR.
JOSEPH N. PAQUIN
BY
ATTORNEYS.

UNITED STATES PATENT OFFICE 2,686,066

HOSE COUPLING WITH LOCKING RIBS

Joseph N. Paquin, Cleveland, Ohio

Application August 3, 1951, Serial No. 240,100

1 Claim. (Cl. 285—84)

This invention relates to connectors for flexible hoses, and more particularly to permanently attached hose connectors or couplings for so-called low pressure (less than about 700 lbs. per square inch working pressure) thick walled rubber or rubber-like hoses.

While it has been known to make so-called low pressure hose end connections of the self-sealing type with nipples having one or more raised ribs disposed interiorly of the bore of the hose near the end of the hose and with clamps or constricting means placed around the hose longitudinally between the end thereof and the rib or ribs of the nipple so that the "blow-off" effect of the pressure tends to increase the grip upon the hose wall between the external constricting means and the rib or ribbed portion of the nipple, still this class or type of hose connection has had but limited utility except when employed under non-arduous conditions of service. Generally speaking it has been my observation that when this practice of making a hose end connection has been employed for more arduous conditions of service as with thicker wall hoses or for higher fluid pressures and for sharply changing pressures or for pressures changing from positive to negative with respect to atmospheric pressure that such connectors tended to be self-destructive by reason of "working" the hose wall too vigorously and in a highly concentrated pressure zone or area tending to squeeze out or cold flow the rubber or rubber-like constituents of the hose wall away from the zone or area of maximum constriction thereby tending inter alia to impair if not destroy the self-locking and self-sealing operation of the connector.

It is among the objects of my invention to preserve and enhance the advantages which appeared to be obtainable in these prior types of hose connectors and to solve the problems that have heretofore been indigenous thereto. In furtherance of this object I have provided a hose connection in which the adverse "working" of the hose wall is eliminated or satisfactorily inhibited and the actual working under a wide range or arduous conditions of service has been restrained and preserved wherewith to preserve and enhance the fluid seal and mechanical grip with beneficient self-sealing and self-locking effects without loss of efficiency and without deleterious cold flow of the hose wall throughout a long life or arduous service. More particularly, according to the precepts of my invention a relatively great mass and area of the hose wall is given somewhat spherical form annularly about, before and behind a correspondingly long, smoothly rounded enlargement of the nipple and is firmly constricted and compressed upon and about such an enlargement whereby blow-off pressure, for example, while tending to enhance the grip and seal of the hose upon the nipple enlargement produces but advantageously restrained motion without building up a deleteriously high unit pressure in the hose wall to induce deleterious cold flow or squeezing out of the gripped and compressed portion of the hose wall. With the large area of highly compressed substantially spherically formed portion of the hose wall I provide that adjacent portions have a gradually declining pressure gradient so that the adjacent masses of the hose wall participate in resisting cold flow without themselves being subjected to deleterious unit pressure or being caused to have deleterious cold flow. Withal the smoothness and length of the nipple enlargement facilitates assembly and attachment of my connector to the hose end.

Another object of my invention is to provide a hose coupling with a relatively light-walled nipple part disposed interiorly of the hose and a light easily formed cup-shaped sleeve gripping the hose exteriorly wherein the parts by mutual coaction strengthen and support one another and secure the hose end mechanically as well as in fluid tight relation to the nipple. Another object is to provide a hose coupling which will be self-locking and self-sealing against negative as well as positive pressure. Another object is to provide a hose coupling of the self-sealing type that is free from the tendency to be self-injurious particularly under adverse conditions of sharply changing pressures. Another object is to provide a hose coupling, the parts of which may be readily attached to the hose end and easily assembled and easily worked to a condition of increased strength and permanent long-lasting attachment. A further object is to provide a hose coupling in which the structural form of the nipple and the external sleeve or ferrule are so complementary and mutually self-sustaining under the stresses and strains to which they are subjected that strength and efficiency is gained from the shape of and coaction between the parts whereby to save in material and in the working of the parts in their manufacture and attachment to the hose end. A general object is to provide a better and cheaper hose end connector particularly adapted for use with so-called low pressure (less than about seven hundred pounds per square inch operating pressure) hydraulic and fluid lines and systems.

These and other objects of my invention will become apparent from the following description of a preferred embodiment thereof, reference being had to the accompanying drawings in which Figure 1 is a side elevation of my improved hose connector or coupling; Figure 2 is a longitudinal section through the hose and coupling showing a first step in the assembly of the hose with the coupling; Figure 3 is a section similar to Figure 2 showing the hose fully disposed in the coupling parts but before the sleeve has been constricted; Figure 4 is a section similar to Figures 2 and 3 showing the completed connection; and Figure 5 is a longitudinal section through the coupling showing the position of the parts when positive pressure in the hose is exerting a substantially maximum effort to blow the hose off the coupling.

Figure 5:
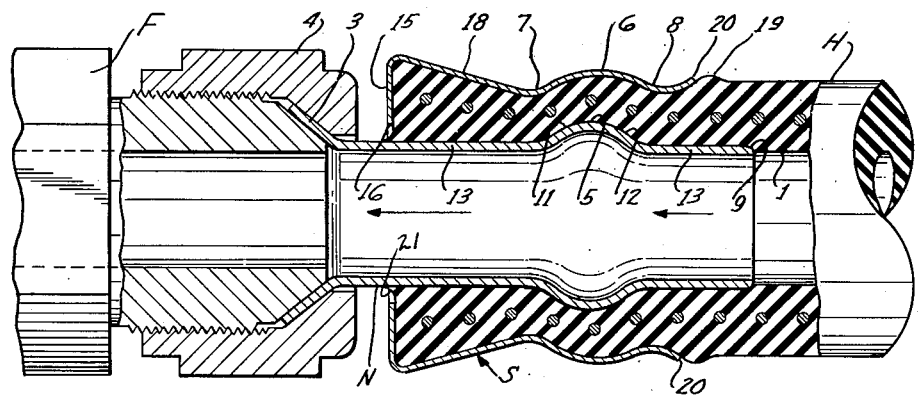

The preferred embodiment of my invention is shown in its final, normal and operative forms in Figures 1, 4 and 5 attached to the end of the hose H and comprising generally a nipple N disposed interiorly of the bore 1 of the hose and an externally disposed sleeve or ferrule S gripping the hose end exteriorly and substantially co-extensively with much of that part of the nipple that is disposed within the bore of the hose. By the coaction between and complementary configurations of the sleeve and nipple the hose end is mechanically secured and given fluid tight sealing and/or self-sealing engagement with the nipple through which fluid is conducted beyond the hose end. The portion of the nipple leading from the hose end may in turn lead to and/or be connected with other instrumentalities and, as shown, may be flared at 3 at its "forward," left as viewed, end and incorporated in a flared swivel connection with the nut 4 and the fitting body F. My connector as presently advised has its especial utility and advantage with so-called low pressure (less than 700 pounds per square inch operating pressure) rubber or rubber-like hoses; the hose H illustrating such a hose in its usual thick wall form conventionally employing a limited amount of wire or fabric reinforcement as at 2. Characteristic of my connector is the annular substantially spherically formed bulbous enlargement 5 near the rear, rightward as viewed, end of the nipple and the complementary annular substantially spherically formed constricted arch 6 in the ferrule S formed between constricted annular grooves 7 and 8 between which arch and grooves and the enlargement of the nipple the wall of the hose is radially compressed and firmly anchored and secured against deleterious movement under both positive and negative pressures; the yielding quality of the hose wall facilitating a desirable "self-energizing" increase in the grip when the hose and ferrule tend to move longitudinally relative to the nipple under the influence of the fluid pressure within the hose and nipple.

The rear end of the nipple N which is tapered or rounded off as at 9 to facilitate insertion within the bore of the hose is formed with a radially outwardly extending annular enlargement 5 comprising a rounded ridge or bulge arcuate in longitudinal section which preferably has a smoothly rounded contour and forwardly and rearwardly sloping compound curved surfaces 11 and 12, respectively, which merge smoothly into the other adjacent straight cylindrical portions 13 of the nipple. The enlargement 5 as well as the flared end 3 of the nipple may be formed by suitable methods well known in the art. The enlargement 5 preferably has an external diameter about 10%–20% greater than the external diameter of the straight portions 13, depending on, inter alia, the receptiveness of the hose. My preference is to employ substantially as great an enlargement of the nipple as can be feasibly forced into the bore of the hose with the aid of appropriate lubricants, without injury to the hose. It will be understood that softer, thicker and less firmly reinforced hose walls are more receptive of larger enlargements on the nipple than harder, thinner and strongly reinforced walls; the former generally characterizing the so-called low pressure hoses being peculiarly adaptable for advantageous use with my invention. Preferably the bulge 5 extends longitudinally of the nipple a distance equal to about one-half to a whole diameter of the nipple, giving the surfaces 11 and 12 substantial length and a moderate slope which facilitates insertion of the nipple into the hose upon initial assembly and affords a wide bearing area for the corresponding large mass of hose wall to be precompressed thereupon. The configuration of the bulge 5 gives strength to the nipple in resistance to radial compression and admits of the employment of nipples of minimum wall thickness consistent with the other fluid and mechanical loads to which they are subjected and facilitates working and forming the nipple in the first instance. Preferably the outside diameter of the straight cylindrical portions 13 of the nipple is about the same or but slightly larger than the inside diameter of the hose and the inside diameter of the portions 13 is but slightly smaller than the inside diameter of the bore of the hose; the thinness of the nipple wall facilitating both the ease of insertion of the nipple into the bore and minimizing restriction of the passage.

The sleeve or ferrule S preferably in its initial form as shown in Figures 2 and 3 comprises a drawn "thin walled" cup with a cylindrical side wall 14 and a perforate "bottom" or end wall 15 having a central aperture 16 of diameter large enough to clear the bulge 5 of the nipple when first assembled thereon.

The sleeve or ferrule S preferably is initially drawn from light sheet metal stock to cup shape as shown. The initial internal diameter of the sleeve is enough larger than the initial outside diameter of the hose so that the latter maybe pushed over the bulge 5 of the nipple and simultaneously into the sleeve S, Figures 2 and 3, during the assembly operation without undue jamming and wedging when the hose is expanded in its passage over the bulge 5 of the nipple. The forward, left as viewed, end of the sleeve comprising the end wall 15 lies in a plane substantially normal to the axis of the longitudinal axis of the sleeve and constitutes a stop or abutment against which the end surface 17 of the hose abuts when these parts are assembled.

The various components which make up the connector are assembled with the hose end preferably in the order shown in Figures 2, 3 and 4. Initially the nut 10 is fitted over the straight nipple after which the bulge 5 and the flare 3 are formed on the nipple by appropriate known flaring and bulging operations. Sleeve S is then positioned as shown in Figure 2 coaxially of the nipple with end wall 15 adjacent the nut whereupon the rear end of the nipple is forcibly inserted into the bore of the hose with sleeve S telescoping over the exterior of the hose in the manner shown in Figure 2. The diameter of the bore 1 of the hose is preferably related to the internal and external diameters of the nipple as above described so that when the nipple is pressed into the hose the nipple with its bulge distends the wall of the hose which in turn tends to conform generally to the shape of the bulge, and takes a corresponding bulbous exterior form snugly within the sleeve S as shown in Figure 3. The resistance offered by the bulge 5 to telescoping movement of the hose may be eased by application of a suitable lubricant. Preferably the forward end 10 of the bore 1 of the hose is rounded off as by grinding or reaming to facilitate assembly. When the nipple has been inserted into the hose end approximately the depth shown in Figure 3, sleeve S will snugly engage the forced enlargement of the hose and will encompass the forward portion of the nipple with the end 17 of the hose in abutment with the end wall 15 of the sleeve as shown in Figure 3 and with the front end of the sleeve spaced a predetermined distance, substantially as shown, from bulge 5 of the nipple and with the rear end of the sleeve spaced somewhat forwardly of the rear end of the nipple.

With the sleeve, nipple and hose end preliminarily assembled as shown in Figure 3, it remains to forcibly constrict the portions of the sleeve wall 14 adjacent the bulge of the nipple to the form shown in Figure 4 and build up a strong state of radial compression in the hose wall all around and adjacent the bulge 5 of the nipple and within the arch 6 and grooves 7 and 8 of the sleeve. In so doing some of the stock of the hose wall is forced into the forward end of the sleeve and against the end wall 15 thereof, filling the forward conically tapered portion 18 of the sleeve and compressing the hose wall against the nipple with radial force that diminishes from a maximum at and adjacent the bulge of the nipple to a minimum at the opening 16 in the forward end wall of the sleeve on the one hand and forwardly of the rear end of the nipple on the other hand; stock of the hose wall being also squeezed rearwardly while the sleeve is forcibly constricted as evidenced by a small external swelling of the O. D. of the hose as at 19 which is accommodated preferably by a slight flaring 20 given the sleeve at its extreme rearward end. The extreme rearward end of the nipple preferably extends, as shown in Figure 4, further into the bore of the hose than the rear end of the sleeve and further than the zone of precompression of the hose wall and prevents any substantial constriction of the I. D. of the bore at or beyond the extreme rearward end of the nipple. I prefer that rearward groove 8 be constricted a little less than the constriction of the forward groove 7 to insure that the gradual diminution of precompression in the hose wall come substantially to zero slightly forwardly of the extreme rearward end of the nipple. The reverse taper 18 given the forward part of the wall 14 gives strength to the wall and develops a pressure gradient in the precompressed hose wall precluding additional cold flow of the stock of the wall through the aperture 16 under all normal conditions of service. Additionally when the hose and connection are under maximum load, as suggested in Figure 5, the stock of the hose wall contained in the reverse tapered portion 18 of the sleeve S acts as a resilient cushion resisting cold flow of the stock of the wall of the hose wall from between the arch 6 and the bulge 5.

To effect the desired forming and constriction of the sleeve and precompression of the hose wall between the sleeve and the nipple, I have found it practicable and advantageous, and I therefore prefer, to employ four simultaneously radially moving dies or die blocks, not shown, each covering a true arcuate quadrant of the constricted sleeve and each having a longitudinally extending sleeve engaging surface complementary to the external form of the constricted sleeve as shown in Figures 1 and 4. In attaching my connectors to hose ends the several dies or die blocks are given simultaneous inward radial motion, crimping and swagging the whole sleeve except the extreme forward end adjacent the wall 15 inwardly to the several and various forcibly reduced annuli of the several diameters shown in Figures 1 and 4. The force with which the dies constrict the sleeve and confine the wall of the hose may be varied with regard to the character of the hose wall and the arduousness of service required of the connector. For rule of thumb, I have found it preferable to exert constricting forces upon the sleeve sufficient to completely fill the forward end of the sleeve with stock of the hose wall that is worked or flowed from adjacent the bulge 5 and arch 6 and/or to initiate visually appreciable cold flow of the stock of the hose wall through the aperture 16 as shown in Figure 4 at 21. The initiation of cold flow or extrusion of hose wall stock at 21 signals the complete filling of the truncated conical forward part of the shell within the reverse taper portion 18 and requires that a strong pressure gradient be built up from the point 21 to the forward end of the zone of maximum compression adjacent the groove 7. Moreover the reverse taper to the maximum diameter of the forward end of the shell taken with the inherent resistance to cold flow of the stock of the hose wall facilitates the advantageous steepness of this pressure gradient since the unconstricted extreme forward end of the shell retains its initial diameter greater than the O. D. of the hose before the constricting operation, see Figure 3, and therefore requires a high constriction of the wall adjacent the arch and bulge, first, to fill the forward end of the shell and then to build up additional pressure adjacent the forward wall 15 to initiate the extrusion at 21. The forcible constriction of the sleeve taken with the distention of the hose wall due to the insertion of the nipple and bulge 5 into the bore of the hose will have materially reduced the wall thickness of the hose wall that is squeezed between the arch 6, grooves 7 and 8 and bulge 5 and will have set up in this relatively large substantially spherically shaped mass of hose wall a firm state of precompression highly resistant to much or significant relative longitudinal movement between the sleeve and the nipple under load while admitting enough motion under load, cf. Figures 4 and 5, to gain self-sealing and self-locking advantages without inducing deleterious cold flow of the stock of the hose wall from between the arch and the bulge. Preferably the arch and the bulge are substantially concentric and concentrically disposed when the hose is not under load and embrace a substantially great length and corresponding mass and volume of hose wall as shown in the drawings.

The configuration of the constricted sleeve with the radial front wall 15, the tapered portion 18 and the coaxial grooves, arch and rearward flare gives the sleeve greatly enhanced strength in its operative form and high resistance to expansion wherewith to maintain the desired precompression in the hose wall and the desired resistance to expansive forces under load. The sleeve thus strengthened and stiffened reinforces and strengthens the nipple and is in turn reinforced by it to the mutual advantage of the parts.

The fact that the sleeve S of my coupling derives strength and rigidity from its constricted shape and from the nipple permits the use of relatively thin-walled tubing for the sleeve without impairing the overall strength of the coupling. For example, for a wire reinforced hose having an I. D. of ¾" and an O. D. of about 1⅛" designed to carry about 300 pounds per square inch working or service pressure, I have found that a free draining brass sleeve having about .024 inch wall thickness is sufficiently strong for its intended functions when the fluid pressure within the hose reaches a test pressure as high as 1000 pounds per square inch. The use of light malleable stock for the shell S of my coupling affords not only economy of material but also permits relatively easy and quick crimping or swagging of the sleeve over the hose end and nipple. Sharp cold working of the sleeve wall 14 from its cylindrical form to its finished tapered, "corrugated" and flared form enhances its strength. In this connection it will be noted that the bulge 5 of the nipple so strengthens this nipple that it permits the forcible crimping of the sleeve without crushing the nipple inwardly; that is, the rounded substantially spherical bulge on and of the nipple adds strength to support the inwardly directed pressure incident to and resulting from the crimping constriction and precompression of the hose wall without causing deformation of the nipple. This construction therefore permits the use of a relatively thin-walled nipple which also reflects economy of material and ease of formation of the nipple. By way of example, I have found that steel nipples with their cylindrical portions having an I. D. slightly less than and an O. D. slightly greater than ¾" and having a wall thickness of 0.32 inch are sufficiently strong for use with the hose and sleeve in the example above mentioned.

The operation of my connector is illustrated with reference to Figures 4 and 5. In Figure 4, the hose and connector are shown under "no load" conditions, that is, when there are no forces working on the coupling tending to separate the hose from the nipple. Here the arch 6 on the sleeve is substantially concentric with the bulge 5 on the nipple. When pressure is built up in the hose the hose tends to blow off the nipple and tends to move the sleeve S rearwardly of the nipple to an extreme position shown with exaggeration in Figure 5. When this action tends to take place the whole annular mass of hose wall adjacent and forwardly of the maximum diameter of the bulge 5 is subjected to increased compression as the shell tends to move rearwardly relative to the nipple and move the arch 6 from its concentric to an eccentric relation relative to the bulge. To the extent that the sleeve is free to move, by virtue of its only connection with the nipple being through the pre-stressed hose wall, sleeve movement facilitates a self-sealing action, pressing the surface of the bore of the hose more tightly onto the nipple. On the other hand the precompressed state of the large mass of hose wall between the arch and the bulge and the graded states of precompression from the wall 15 to the groove 7 resist such motion without creating such high unit pressures, as for example between the groove 7 and the most proximate part of the forward surface 11 of the bulge 5, to induce cold flow of the stock of the hose wall under the groove 7 against the adjacent stock forwardly of the groove, especially since that stock is precompressed to the high point of the pressure gradient of precompression within the taper 18 and resists cold flow forwardly from under the groove 7. Were the fluid pressure in the hose to drop suddenly or become negative the sleeve would tend to move sharply forwardly tending to trap and work hose wall stock out of the orifice 16, but this hazard is avoided by inhibiting cold flow of stock forwardly of the groove 7 in the first instance as above described and is further insured against by the rearward portions of the arch and the bulge and the groove 8 squeezing the great mass of hose wall stock rearwardly of the maximum diameter of the bulge, aided by the pressure gradient in the stock rearwardly of the groove 8. In this way excessive working of the stock is prevented and the preservation of the same large mass of precompressed stock between the arch and the bulge is kept operatively intact.

In gross all the parts of the connector in coaction with the precompressed hose wall tend to keep the arch and bulge concentrically disposed with the hose wall firmly and uniformly precompressed therebetween and permit enough motion of eccentricity between the arch and the bulge to take place under load to be advantageously "self-energizing" in resistance to leakage and rupture without being self-injurious, whether in respect to losing the main grip between the arch and the bulge or losing stock through the forward orifice or forcing stock beyond the rear end of the nipple to impair the I. D. of the bore of the hose. When the hose is functioning under high and/or changing negative pressures the forward motion of the sleeve is used to advantage and resisted in the same way its rearward movement is resisted under positive pressures. Negative pressures being relatively small compared to positive working pressures the somewhat lesser constriction of the rearward groove 8 while sufficient for the purposes described hereinabove permits the connector as a whole to be shortened a little rearwardly of the bulge while retaining a desirable pressure gradient rearwardly of the groove 8 terminating near enough the rear end of the nipple to avoid deleterious restriction of the I. D. of the bore of the hose adjacent thereto.

Modifications, changes and improvements to the above described and illustrated preferred form and embodiment of my invention may occur to those skilled in the art without departing from the spirit and substance of my invention. I therefore do not wish to be limited to this preferred embodiment of my invention, nor in any manner inconsistent with the advance which my invention marks over the prior art.

I claim:

A hose end connector for a thick walled rubber-like hose end comprising a generally cylindrical nipple element having an annular bulge of substantially spherical form; the nipple with its bulge being disposed interiorly of the bore of the hose and distending the wall of the hose adjacent the end of the hose and giving the hose wall an annular rounded enlargement adjacent and externally of the said bulge, and an external sleeve element having an end wall against which the end of the hose abuts and an annular side wall extending from said end wall surrounding and constricting a portion of the hose in which said nipple is disposed, said end wall having an aperture clearing the nipple, the side wall of said sleeve being formed with an annular outwardly convex substantially spherical rounded arch merging with a pair of outwardly concave annular grooves between which grooves and arch and the said bulge of the nipple a mass of the wall of the hose of greater longitudinal extent than the thickness of the hose wall is stressed in a state of radial compression and constrained in the absence of fluid pressure in the hose to a substantially uniform pre-stressed wall thickness; the arch of said sleeve element being substantially concentric with the bulge of the nipple when the hose is not under load, the portion of said sleeve between the forward groove and said end wall being tapered outwardly from said forward groove toward said end wall, the compression of the wall of the hose within said tapered sleeve portion reducing from a maximum pressure at said forward groove to a minimum pressure at said aperture sufficient however to intiate bulging of stock of the hose wall therethrough.

References Cited in the file of this patent

UNITED STATES PATENTS

| Number | Name | Date |
|---|---|---|
| 1,786,489 | Hopkins | Dec. 30, 1930 |
| 1,825,005 | Loughead | Sept. 29, 1931 |
| 1,962,060 | Emery | June 5, 1934 |
| 2,000,680 | Weatherhead | May 7, 1935 |
| 2,073,909 | Stecher | Mar. 16, 1937 |
| 2,146,756 | Miller | Feb. 14, 1939 |
| 2,211,446 | Troshkin | Aug. 13, 1940 |
| 2,479,702 | Rood | Aug. 23, 1949 |